Patented Sept. 17, 1946

2,407,635

UNITED STATES PATENT OFFICE 2,407,635

PREPARATION FOR TREATING LAUNDERABLE FABRIC ARTICLES

Herman Engler, New York, N. Y., assignor to Paul Koletzko and C. Alfred Hands, New York, N. Y.

No Drawing. Application August 16, 1944, Serial No. 549,812

1 Claim. (Cl. 106—208)

This invention relates to a preparation for treating cotton, linen or other launderable fabric articles for improving their appearance and wearing quality.

The invention primarily comprehends a preparation for treating launderable fabric articles which have become worn or are dull in appearance so that they do not present an attractive or pleasing appearance after laundering and which preparation is adapted to impregnate and cover the fibers of the fabrics and to compact the same so as to impart a smoothness to the surfaces of worn, roughened or shoddy articles and to restore the natural brightness and luster to the fabrics.

The invention further has in view a preparation of the indicated character which is miscible with starch dissolved in water for treating the fabrics therewith during the starching operation and which preparation may also be mixed with the last rinsing water for applying the same to the fabrics.

With the foregoing and other objects in view, reference is now made to the following specification in which is set forth the preferred ingredients of the preparation and the manner of producing the same.

In carrying out the invention use is made of a vegetable gum and an agent for facilitating flowing thereof and the penetration of the preparation into the fibers of the fabrics as well as imparting flexibility to the preparation after the same has dried. The gum and agent are dissolved in an alkaline vehicle whereby the ingredients are thoroughly incorporated in the solution so as to permit of even distribution thereof on the surface of the fabrics. The vegetable gum may be gum tragacanth, gum arabic or gum karaya or other gum possessing similar properties. The agent is preferably glycerine and pectin while the alkaline vehicle is preferably a solution of sodium borate.

The preparation may be produced by soaking approximately 4 ounces of the vegetable gum in approximately 20 pounds of water for a period of approximately two days during which time it is agitated at intervals to effect a thorough colloidal suspension thereof in the water. Three pounds of glycerine is then added to the colloidal solution which is thoroughly mixed therewith by agitating or stirring. To the resulting mixture is added a solution of sodium borate in water which renders the mixture alkaline and effects complete dissolution or dispersion of the gum. The sodium borate solution is preferably prepared by mixing approximately ½ pound of sodium borate in approximately one pound of boiling water and bringing the solution to the boiling temperature. An emulsified solution of gum, pectin and glycerine in water is then added to the alkaline solution of gum and glycerine and the mixture agitated for a short period to thoroughly incorporate the ingredients in the solution. The emulsified solution is in the proportion of 1 pound to the aforesaid proportions of gum and glycerine in the alkaline solution. The resulting mixture of the aforesaid alkaline and emulsified solutions provides the preparation for treating fabric articles to enhance their appearance and wearing quality as described.

The emulsified solution is prepared by mixing approximately 2 ounces of any of said gums, 2 ounces of pectin and 1 pound of glycerine in 2 quarts of water. This produces approximately 5¼ pounds of the emulsified solution but only the proportions thereof above given is mixed with the alkaline solution.

In use the preparation may be employed as desired during the laundering operation, either in the last rinsing water or in the starch solution which is preferably in the proportions of 1 pint of the preparation to 15 gallons of the rinse water or 15 gallons of the starch solution.

What is claimed is:

A preparation useful in laundering, comprising substantially the following proportions by weight of the named ingredients:

| | Pounds |
|---|---|
| Gum tragacanth | ¼ |
| Glycerine | 3 |
| Sodium borate | ½ |
| Emulsified solution | 1 | said emulsified solution being composed of:

| | Pounds |
|---|---|
| Gum tragacanth | ⅛ |
| Pectin | ⅛ |
| Glycerine | 1 |
| Total water in excess of about | 20 |

HERMAN ENGLER.